United States Patent
Liou

(10) Patent No.: US 7,668,566 B2
(45) Date of Patent: Feb. 23, 2010

(54) SPEAKER MICROPHONE CONNECTOR FOR COMMUNICATOR

(76) Inventor: Henry Liou, 911 Mariner St., Brea, CA (US) 92821

( * ) Notice: Subject to any disclaimer, the term of this patent is extended or adjusted under 35 U.S.C. 154(b) by 509 days.

(21) Appl. No.: 11/515,130

(22) Filed: Sep. 1, 2006

(65) Prior Publication Data

US 2008/0057879 A1 Mar. 6, 2008

(51) Int. Cl.
*H04M 1/00* (2006.01)
(52) U.S. Cl. .................... 455/556.1; 455/3.03; 455/15; 455/74; 455/90.2; 381/59; 381/85; 381/386
(58) Field of Classification Search ............. 455/556.1, 455/3.03, 15, 74, 557, 569.1, 90.2, 90.1, 455/100, 128; 381/59, 305, 85, 386
See application file for complete search history.

(56) References Cited

U.S. PATENT DOCUMENTS

| | | | | |
|---|---|---|---|---|
| 4,700,375 | A * | 10/1987 | Reed ........................... | 455/573 |
| 4,748,685 | A * | 5/1988 | Rozanski, Jr. ............... | 455/218 |
| 4,792,986 | A * | 12/1988 | Garner et al. .............. | 455/90.2 |
| 5,586,176 | A * | 12/1996 | Peck .......................... | 379/175 |
| 5,884,199 | A | 3/1999 | Maki | |
| 6,311,052 | B1 * | 10/2001 | Lenz .......................... | 455/305 |
| 6,490,443 | B1 * | 12/2002 | Freeny, Jr. .................. | 455/406 |
| 6,959,203 | B2 * | 10/2005 | Claxton et al. ........... | 455/556.1 |
| 7,023,338 | B1 * | 4/2006 | Foth ....................... | 340/539.13 |
| 7,062,301 | B1 * | 6/2006 | Dieringer .................. | 455/569.1 |
| 2003/0132884 | A1 * | 7/2003 | Ragner et al. ............... | 343/702 |
| 2004/0132515 | A1 * | 7/2004 | Sunaga .................... | 455/575.7 |
| 2007/0111754 | A1 * | 5/2007 | Marshall et al. .......... | 455/556.1 |
| 2008/0125042 | A1 * | 5/2008 | Kim .......................... | 455/41.2 |
| 2008/0159364 | A1 * | 7/2008 | Rofougaran ................ | 375/219 |
| 2009/0109054 | A1 * | 4/2009 | Ueda et al. ............. | 340/825.72 |

FOREIGN PATENT DOCUMENTS

JP 3130461 5/1997

OTHER PUBLICATIONS

Bob Bruninga, APRS Mic-Lite ARRL and TAPR Digital Communications Conference 18th, 13 pages, Phoenix, Sep. 24-26, 1999.

* cited by examiner

*Primary Examiner*—Minh D Dao
(74) *Attorney, Agent, or Firm*—David and Raymond Patent Firm; Raymond Y. Chan

(57) ABSTRACT

A RF communication system includes a speaker microphone connector connecting a communication station with a communication unit to transmit an audio signal and RF signal therebetween. The speaker microphone connector includes an audio cable, a RF cable and a tubular enclosing shelter enclosing the audio cable and the RF cable therein, wherein an end portion of the RF cable extends out of the enclosing shelter between first and second ends thereof such that the end portion of the RF cable is split with the audio cable to individually connect to the communication station. In addition, a retaining device is provided at the enclosing shelter to retain the RF cable and the audio cable in a splitting manner.

26 Claims, 5 Drawing Sheets

SPEAKER MICROPHONE CONNECTOR FOR COMMUNICATOR

BACKGROUND OF THE PRESENT INVENTION

1. Field of Invention

The present invention relates to a communication system, and more particularly to a RF communicator which comprises a speaker microphone connector connecting between a communication station and a communication unit to transmit an audio signal and a RF signal while being cost effective.

2. Description of Related Arts

Conventional communication system device comprises a base unit, a speaker unit, and an audio cable. The base unit has an antenna for receiving RF signal, a RF process unit, an audio process unit, a connector for connecting the audio cable. The speaker unit has a speaker and microphone and can transmit audio and RF signal with the base unit through the audio cable. When the communication system device is in use, a user usually mount the base unit at his/her waist area and the speaker unit is mounted on his/her shoulder so that it is more convenient for the user to reach for the speaker and the user can listen to the speaker easier. The problem with such a conventional design is that the antenna is installed at the base unit which is usually mounted at the waist area of the user thus lowering the receiving capability of the RF signals because the antenna can receive better RF signal if it is mount at a higher elevation location.

The above discussed design is the most basic communication system device. To overcome the problem of bad RF reception, the antenna is installed at the speaker unit instead of the base unit. This design leads to another conventional communication system device. With the antenna installed at the speaker unit now, it offers a much better RF reception. Since the antenna is now mounted on the speaker unit, there requires a way to communicate with the base unit to process these RF signal. The audio cable which connects the speaker unit and the base unit will now also require having a RF wire to transmit signals from the antenna. The conventional design has the RF wire separated at one end of the audio cable wherein the RF wire is then connected separately to the base unit to process the RF signals. Although this conventional design offers a better reception for the RF signal, the manufacturing of such a connector at the end of the audio cable with the RF wire separating out from the audio wire is extremely difficult. It is also known that the RF wire has to be completely enclosed because they are highly sensitive to surrounding noise and interferences. Therefore, this design really complicates the manufacturing process of such connector that needs to separate the RF wire out from the cable and effectively reroute it to the base unit.

In remedy to the above described problem, another conventional design proposed to keep the RF wire within the audio cable together with the audio wire and to plug the cable in all at once to avoid the complicated manufacturing process of the above described connector adapting to the base unit. This design thus eliminates the complication of the connector but it requires additional wiring arrangement inside the base unit for connecting the RF wire. Since such design requires a different electrical construction for the base unit, and the manufacturing cost for the base unit is expensive and complicated at the same time.

SUMMARY OF THE PRESENT INVENTION

A main object of the present invention is to provide a RF communication system wherein a RF cable is separated from an audio cable within a speaker microphone connector, the speaker microphone connector is easy to manufacture but yet still provides a great RF reception and a stable signals transfer.

Another object of the present invention is to provide a RF communication system wherein a RF cable is separated from an audio cable within a speaker microphone connector and the RF cable is sealedly enclosed to ensure a reliable and stable signal transfer so as to minimize interferences.

Another object of the present invention is to provide a RF communication system having a one-piece integrated adapter which is easy to install and does not involve complicated mechanical structure.

Another object of the present invention is to provide a RF communication system which does not involve complicated mechanical structure, so as to minimize the manufacturing cost and other related expenses of the audio communication system.

Another object of the present invention is to provide a process of manufacturing a speaker microphone connector for communicatively connecting a communication unit to a communication station, wherein the manufacturing process of the speaker microphone connector does not involve complicated mechanical structure but yet still provides a RF communication system a great RF reception and a stable signals transfer.

Accordingly in order to accomplish the above objects, the present invention provides a RF communication system comprising:

a communication station which comprises an audio unit, an audio outlet operatively connected to the audio unit, a RF unit, and a RF outlet operatively connected to the RF unit;

a communication unit which comprises an audio transmitter and a RF transmitter; and a speaker microphone connector, which comprises:

an audio transmission unit comprising an audio cable electrically extended from the audio transmitter and an audio connector which is electrically coupled with the audio cable and is connected with the audio outlet of the communication station for transmitting an audio signal between the communication station and the communication unit through the audio cable;

a RF transmission unit comprises a RF cable operatively extended from the RF transmitter and a RF connector which is operatively coupled with the RF cable and is connected with the RF transmitter for transmitting RF signal between communication station and the communication unit through the RF cable; and a tubular enclosing shelter having a first end extended from the communication unit, a second end coupling with the audio connector, an interior cavity receiving the audio cable and the RF cable therein that an end portion of the RF cable is extending out of the enclosing shelter position between the first and second ends thereof to couple with the RF connector, and means for retaining the RF cable in a splitting manner.

These and other objectives, features, and advantages of the present invention will become apparent from the following detailed description, the accompanying drawings, and the appended claims.

DETAILED DESCRIPTION OF THE PREFERRED EMBODIMENT

Figure 1:
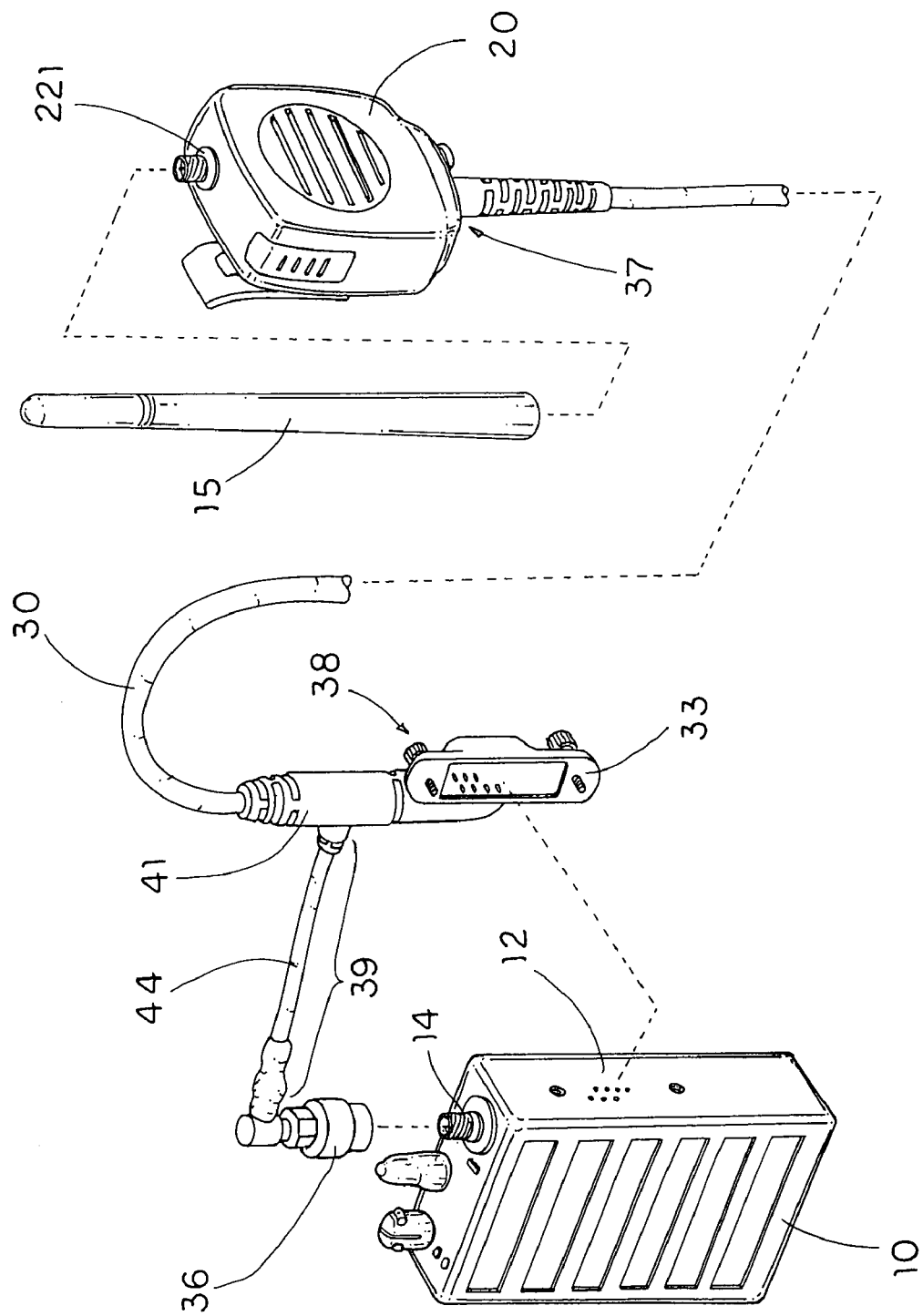
FIG. 1 is a perspective view of a RF communication system according to a preferred embodiment of the present invention.

Referring to FIG. 1 of the drawings, the preferred embodiment of the present invention illustrates an audio communication system comprising a communication station 10 which comprises a first signal unit, a first signal outlet, operatively connected to the first signal unit, a second signal unit, a second signal outlet operatively connected to the second signal unit.

Accordingly, the communication station is a RF communication station that the first signal unit is an audio unit 11, the first signal outlet is an audio outlet 12 operatively connected to the audio unit 11, the second signal unit is a RF unit 13, and the second signal outlet is a RF outlet 14 operatively connected to the RF unit 13. The communication station 10 is usually mounted at a waist area of the user so that it is convenient for the user to reach for. The audio unit 11 and the RF unit 13 are capable of processing an audio and RF signals which are transferred to the communication station 10 through the audio outlet 12 and the RF outlet 14. The RF outlet is also adapted to fit an antenna 15 so as to receive the RF signals.

Figure 2:
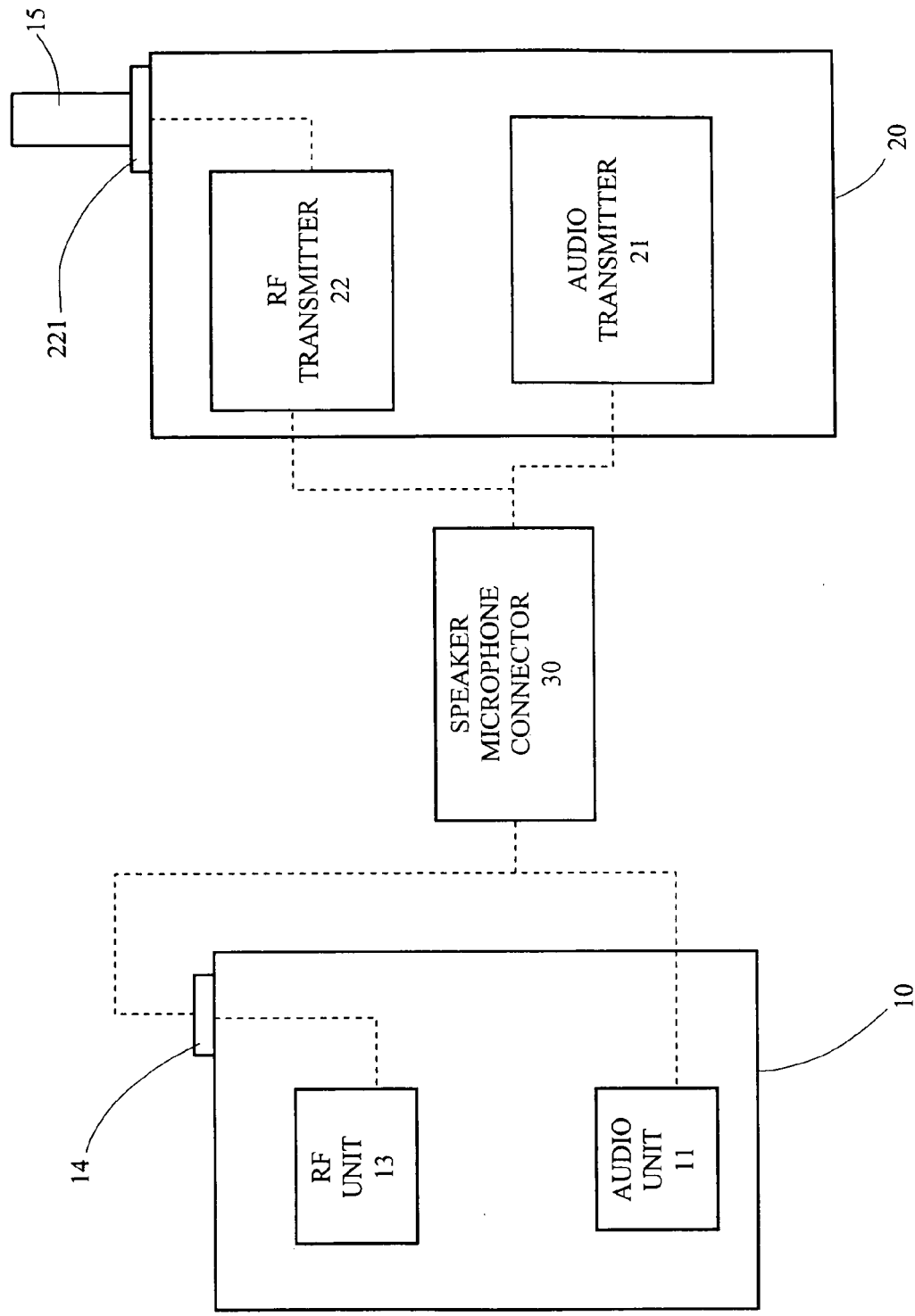
FIG. 2 is wiring diagram between the communication station and the communication unit through the speaker microphone connector according to the above preferred embodiment of the present invention.

Referring to FIG. 2 of the drawings, the communication system further comprises a communicator communicating with the communication station 10, wherein the communicator comprises a communication unit 20 and a speaker microphone connector 30 connecting the communication station 10 with the communication unit 20.

The communication unit 20 comprises a first transmitter and a second transmitter. According to the preferred embodiment, the first transmitter is an audio transmitter 21 and the second transmitter is a RF transmitter 22.

The communication unit 20, which is embodied as a PTT (Push-To-Talk) communication device, is mounted as a higher elevation location so as to achieve a better reception for the RF signals. The communication unit 20 could be mounted on a shoulder position of the user for example, so it is easy for the user to reach for when the user needs to speak or listen. The audio transmitter 21 is capable of transmitting an input voice signal ultimately to the audio unit 11 of the communication station 10 for processing. The RF transmitter 22 is capable of transmitting RF signals between the communication station 10 and the communication unit 20 which ultimately allows the communication system to communicate with the other communication systems. The RF transmitter 22 further has a supplemental RF outlet 221 wherein the antenna 15 for receiving RF signal is coupled with the outlet according to the preferred embodiment of the present invention. Since the communication unit 20 has a high elevation than the communication station 10, it offers a better reception for the RF signal. It is worth to mention that the antenna 15 is originally mounted at the RF outlet 14 of the communication station 10 to communicate with the RF unit 13 thereof. The antenna 15 is detached from the communication station 10 and is detachably mounted to the supplemental RF outlet 221 of the communication unit 20 to communicate with the RF transmitter 21. In other words, the structural configuration of the supplemental RF outlet 221 is the same as the RF outlet 14 that the antenna 15 receives the RF signal at the communication unit 20 and transmits the RF signal to the communication station 10 through the speaker microphone connector 30.

The speaker microphone connector 30 comprises a first signal transmission transmitting a first signal between the first signal unit of the communication station 10 and the first signal transmitter of the communication unit 20, and a second signal transmission transmitting a second signal between the second signal unit of the communication station 10 and the second signal transmitter of the communication unit 20.

According to the preferred embodiment, the first signal transmission comprises an audio transmission unit 31 and a plurality of audio cables 32 electrically extended from the audio transmitter 21. The audio transmission unit 31 further comprises an audio connector 33 which is electrically coupled with the plurality audio cable 32 and is connected with the audio outlet 12 of the communication station 10 for transmitting the audio signal as the first signal between the communication station 10 and the communication unit 20 through the audio cable 32. The audio cable 32 is made of electrical wires and is capable of transferring audio signals.

The second signal transmission comprises a RF transmission unit 34 which comprises a RF cable 35 operatively extended from said RF transmitter 22. The RF transmission unit 34 further comprises a RF connector 36 which is operatively coupled with the RF cable 35 and is connected with the RF transmitter 22 for transmitting RF signal as the second signal between the communication station 10 and the communication unit 20 through the RF cable 35. The RF cable 35 is made of an electrical wire which is capable of transferring RF signals. The length of the speaker microphone connector 30 should be long enough to at least connect the communication unit 20 from the shoulder position of the user to the communication station 10 from the waist position of the user.

Figure 3:
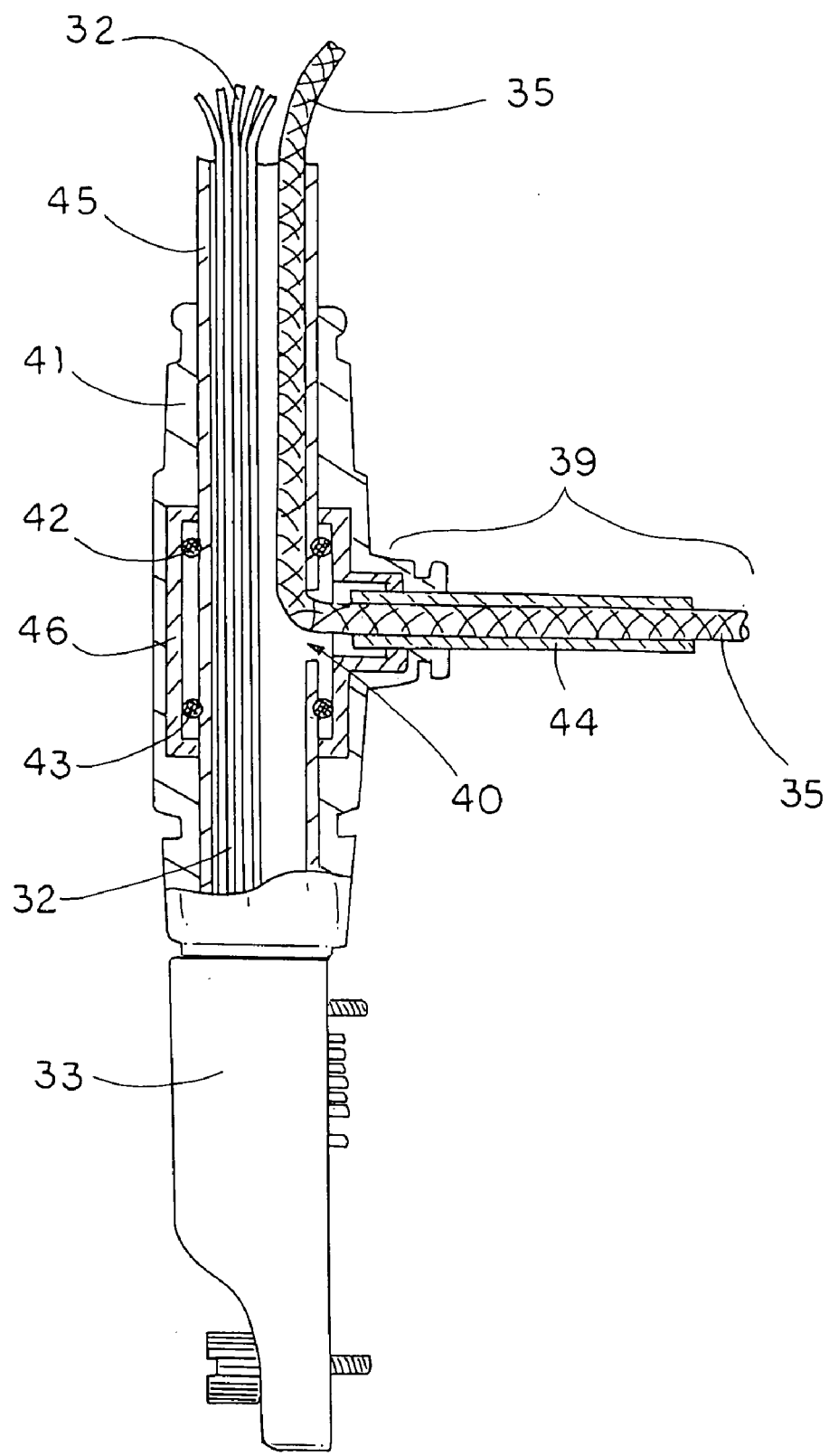
FIG. 3 is perspective view of the speaker microphone connector according to the above preferred embodiment of the present invention, showing the splitting manner of the RF cable from the audio cable.

According the FIG. 3 of the drawings, the speaker microphone connector 30 further comprises a tubular enclosing shelter 45 having a first end 37 extended from said communication unit 20. A second end 38 couples with the audio connector 33. The tubular enclosing shelter 45 has an interior cavity receiving the audio cable 32 and the RF cable 35 therein. An end portion 39 of the RF cable 35 is extending out of the enclosing shelter 45 position between the first and second ends 37, 38 thereof to couple with the RF connector 36. The speaker microphone connector 30 further comprises means for retaining the RF cable 35 in a splitting manner. In order to conveniently separate the RF cable 35 from the audio cable 32, a different color cable could be use as the RF cable 35 so that users can easily recognize the RF cable 35. In fact, the structure of the RF cable 35 is different from that of the audio cable 32 such that a person who skills in that art should able to recognize the RF cable 35 to be separated. The length of the enclosing shelter 45 should give a space which allows the users to conveniently separate the RF cable 35 and arrange in the splitting manner. The tubular enclosing shelter 45 is made of flexible material such as PVC tube so that it is capable to bend and adapt for different. It is worth to mention that since the end portion 39 of the RF cable 35 is extended out of the enclosing shelter 45 position between the first and second ends 37, 38 thereof to couple with the RF connector 36 but not extended out at the audio connector 33, the electrical configuration of the speaker microphone connector 30 can be simplified. Especially when the size of the audio connector 33 is relatively small, the RF cable 35 does not need to be pass through the audio connector 33 to split with the audio cable 32 so as to keep the structural and electrical configuration of the audio connector 33 as simple as possible.

The retaining means of the speaker microphone connector 30 contains a splitting slit 40 formed at the enclosing shelter 45 between the first and second ends 37, 38 thereof. The end portion 39 of said RF cable 35 extends out of the interior cavity of the enclosing shelter 45. A portion along of the enclosing shelter 45 can be cut along the speaker microphone connector 30 so that the RF cable 35 can be pulled out in the splitting manner. The enclosing shelter 45 further comprises a sealing element 41 sealedly attached to the enclosing shelter 45 to sealedly enclose the splitting slit 40 so as to retain the RF cable 35 in a splitting manner. The enclosing shelter 45 is made of flexible material so that to provide a convenient installation. The enclosing shelter 45 ensures a better sealing of the RF cable 35 from the surrounding so as to minimize the interference and noise the RF cable 35 might experience. The sealing element 41 is integrally extended from the audio connector 33 to form a one-piece integrated adapter 42 according to the preferred embodiment of the present invention.

According to the preferred embodiment of the present invention illustrated in FIG. 3 of the drawings, the retaining means of the speaker microphone connector 30 further comprises two securing rings 42, 43 securely attaching to the enclosing shelter 45 at two slit ends of the splitting slit 40 respectively so as to securely hold the RF cable 35 and the audio cable 32 in position along the splitting slit 40. The two securing rings 42, 43 are made of metallic materials and help to strengthen the mechanical structure of the enclosing shelter 45. The two securing rings 42, 43 also help define the space which allows the users to conveniently separate the RF cable 35 and arrange it in the splitting manner.

Figure 4:
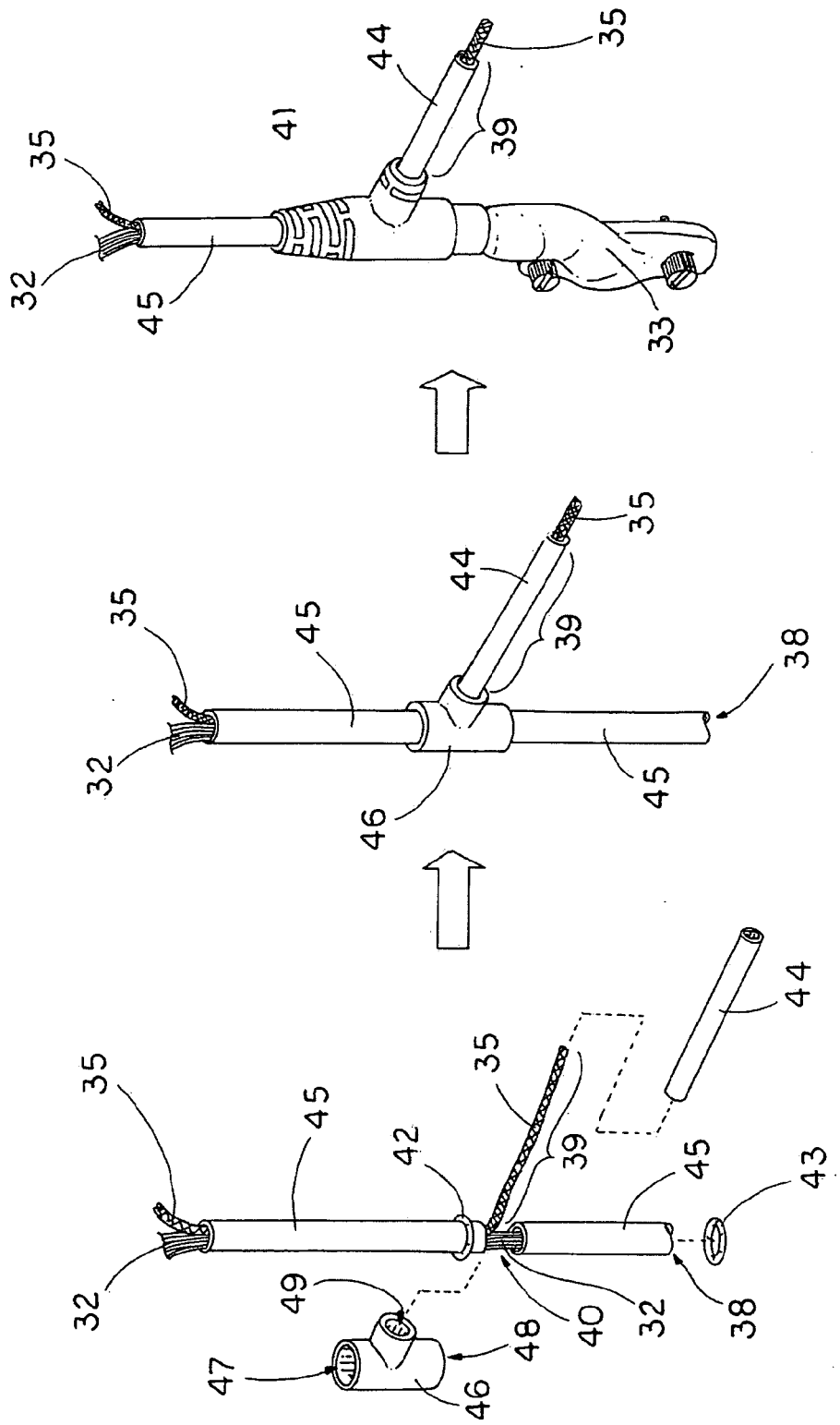
FIG. 4 illustrates the manufacturing process of the speaker microphone connector according to the above preferred embodiment of the present invention.

Accordingly, the portion of the enclosing shelter 45 is cut along a circumferential thereof to form the splitting slit 40 to allow the end portion of the RF cable 35 extending out of the interior cavity through the splitting slit 40. In other words, a portion of the enclosing shelter 45 is cut off as shown in FIG. 4. Alternatively, the splitting slit 40 can be formed by a longitudinal cut along the enclosing shelter 45 to form a gap thereon so as to allow the end portion of the RF cable 35 extending out of the interior cavity through the gap. And it should be noted that the ways of forming the splitting slit 40 are not only limited to the two methods described above as long as the portion of the enclosing shelter 45 is cut out and the RF cable 35 is pulled out between the first and second ends 37, 38.

The retaining means of the speaker microphone connector 30 further comprises a sealing shelter 44 which extends from the enclosing shelter 45 to the RF connector 36 and receives the end portion 39 of the RF cable 35 in a concealed manner. The sealing shelter 44 provides an extra sealing in addition to the enclosing shelter 45 to ensure a complete sealing of the RF cable 35 from the surrounding so as to minimize the interference and noise the RF cable 35 might experience. The sealing shelter 44 is made of flexible material such as PVC tube so that so that the speaker microphone connector 30 is capable to bend and adapt for different situations.

According to the preferred embodiment of the present invention as shown in FIG. 3 of the drawings, the retaining means of the speaker microphone connector 30 further comprises a T-shaped tubular retainer 46 securely mounted at the enclosing shelter 45 at the splitting slit 40. The tubular retainer 46 has first, second and third openings 47, 48, 49 that the plurality of audio cable 32 is extended from the first opening 47 to the second opening 48 within the interior cavity. The end portion 39 of the RF cable 35 is extended from the first opening 47 to the third opening 49 to extend out of the interior cavity of the enclosing shelter 45. In other words, during the manufacturing process, a user inserts the speaker microphone connector 30 comprising both the audio cable 32 and RF cable 35 into the first opening 47 of the tubular retainer 46. The user then split and pick out the RF cable 35 and insert it into the third opening 49 of the tubular retainer 46. The plurality of audio cable 32 then passes through the second opening 48 of the tubular retainer 46 and is connected to the audio connector 33. The T-shaped tubular retainer 46 helps the users to split the RF cable 35 manually and provides an additional safety protection to the plurality of audio cable 32 and the RF cable 35.

Figure 5:
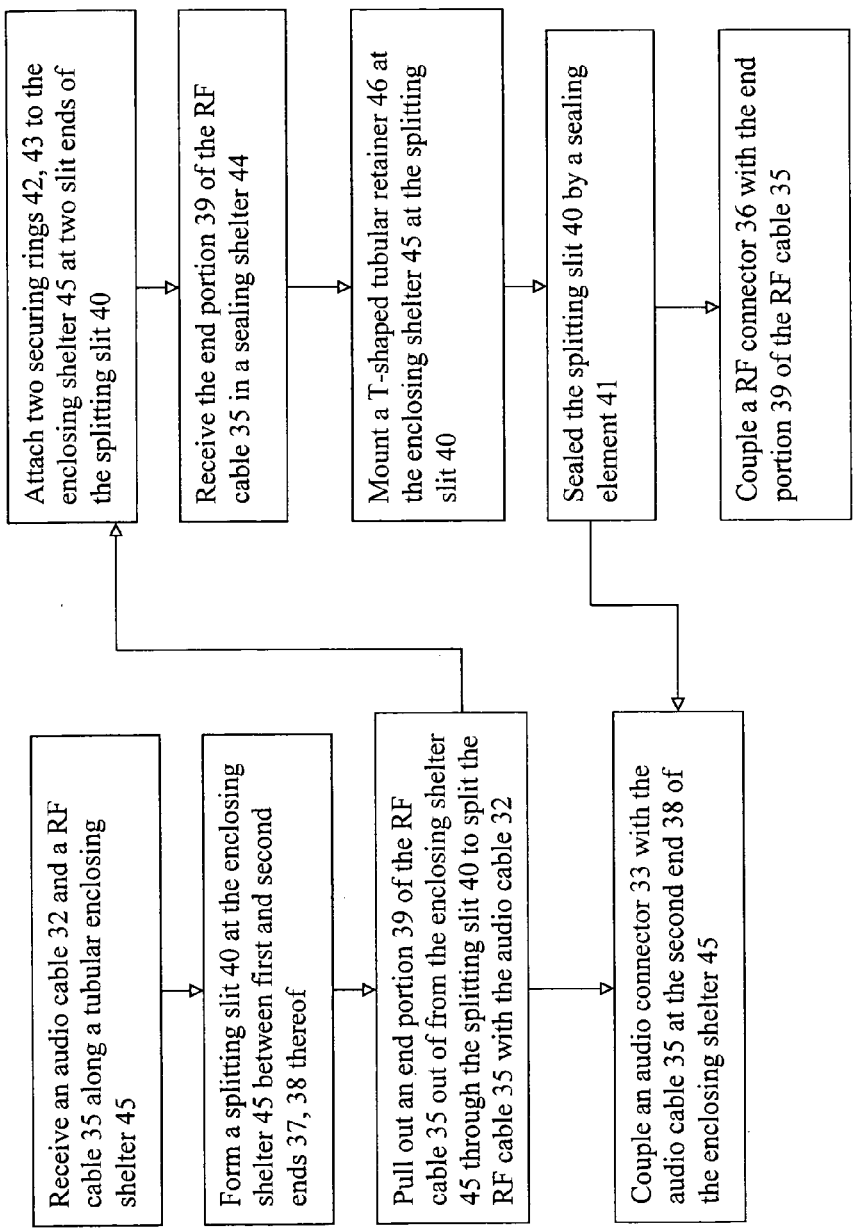
FIG. 5 is flow chat illustrating the manufacturing process of the speaker microphone connector according to the above preferred embodiment of the present invention.

The present invention also discloses a process of manufacturing the speaker microphone connector 30 to communicatively connect the communication unit 20 to the communication station 10 as shown in FIG. 5 of the drawings. The process comprises the steps of:

(a) receiving the audio cable 32 and the RF cable 35 along the tubular enclosing shelter 45, wherein the audio cable 32 is electrically extended from the audio transmitter 21 of the communication unit 20 while the RF cable 35 is operatively extended from the RF transmitter 22 of the communication unit 20;

(b) forming the splitting slit 40 at the enclosing shelter 45 between first and second ends 37, 38 thereof, wherein the first end 37 of the enclosing shelter 45 is extended from the communication unit 20;

(c) pulling out the end portion 39 of said RF cable 35 out of an interior cavity of the enclosing shelter 45 through the splitting slit 40 such that the RF cable 35 is split with the audio cable 32 at the splitting slit 40;

(d) electrically coupling the audio connector 33 with the audio cable 35 at the second end 38 of the enclosing shelter 45 to connect with the audio outlet 12 of the communication station 10 for transmitting the audio signal between the communication station 10 and the communication unit 20 through the audio cable 35;

(e) operatively coupling the RF connector 36 with the end portion 39 of the RF cable 35 to connect with the RF outlet 14 of the communication station 10 for transmitting the RF signal between the communication station 10 and the communication unit 20 through said RF cable.

The process further comprises a step of sealedly attaching the sealing element 41 to the enclosing shelter 45 to sealedly enclose the splitting slit 40 so as to retain the RF cable 35 in the splitting manner. The sealing element 41 ensures a better sealing of the RF cable 35 from the surrounding so as to minimize the interference and noise the RF cable 35 might experience. In addition, the sealing element 41 can be sealed at the enclosing shelter 45 at any location where the splitting slit 40 is formed thereat, so as to simplify the manufacturing process of the speaker microphone connector 30.

The process further comprises a step of extending the sealing element 41 integrally from the audio connector 33 to form the one-piece integrated adapter 42. The one-piece integrated adapter 42 is more convenient for users to plug in and it offers an extra sealing to the RF cable to minimize the interference and noise.

The process further comprises a step of securely attaching the two securing rings 42, 43 to the enclosing shelter 45 the at two slit ends of the splitting slit 40 respectively so as to securely hold the RF cable 35 and the audio cable 32 in position along said splitting slit 40. The two securing rings 42, 43 help strengthen the mechanical structure of the enclosing shelter 45 and define the space which allows the process to conveniently separate the RF cable 35 and arrange it in the splitting manner.

Step (b) of the process further comprises a step of cutting off the portion of the enclosing shelter 45 along a circumferential thereof to form the splitting slit 40 to allow the end portion 39 of the RF cable 35 extending out of the interior cavity through the splitting slit 40. It should be noted that the step of cutting off the portion of the enclosing shelter 45 should not be only limited to the examples described above.

Step (c) of the process further comprises a step of receiving the end portion 39 of the RF cable 35 in the sealing shelter 44 in a concealed manner. The sealing shelter 44 offers a better sealing to the RF cable so as to minimize the interference and noise.

The process further comprises a step of securely mounting the T-shaped tubular retainer 46 at the enclosing shelter 46 at the splitting slit 40. The tubular retainer 46 has first, second and third openings 47, 48, 49 respectively. The audio cable 32 is extended from the first opening 47 to the second opening 48 within the interior cavity. And the end portion 39 of the RF cable 35 is extended from the first 47 opening to the third opening 49 to extend out of the interior cavity of the enclosing shelter 45. The T-Shaped tubular retainer 46 makes it more convenient for the user to split the RF cable 35 and helps retain the RF cable 36 and audio cable 32. It is worth to mention that the securing rings 42, 43 can be omitted when the tubular retainer 46 tightly mounted at the enclosing shelter 46 such that the tubular retainer 46 can securely retain the audio cable 32 and the RF cable 36 in position.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A RF communicator for connecting with a communication station having an audio unit, an audio outlet, a RF unit, and a RF outlet, wherein said RF communicator comprises:
   a communication unit which comprises an audio transmitter and a RF transmitter; and
   a speaker microphone connector, which comprises:
   an audio transmission unit comprising an audio cable electrically extended from said audio transmitter and an audio connector which is electrically coupled said audio cable for connecting with said audio outlet of said communication station so as to transmit an audio signal between said communication station and said communication unit through said audio cable;
   a RF transmission unit comprises a RF cable operatively extended from said RF transmitter and a RF connector which is operatively coupled with said RF cable for connecting with said RF outlet to transmit RF signal between communication station and said communication unit through said RF cable; and
   a tubular enclosing shelter having a first end extended from said communication unit, a second end coupling with said audio connector, an interior cavity receiving said audio cable and said RF cable therein that an end portion of said RF cable is extending out of said enclosing shelter position between said first and second ends thereof to couple with said RF connector, and means for retaining said RF cable in a splitting manner.

2. The RF communicator, as recited in claim 1, wherein said retaining means contains a splitting slit formed at said enclosing shelter between said first and second ends thereof for said end portion of said RF cable extending out of said interior cavity of said enclosing shelter, and comprises a sealing element sealedly attached to said enclosing shelter to sealedly enclose said splitting slit so as to retain said RF cable in a splitting manner.

3. The RF communicator, as recited in claim 2, wherein said sealing element is integrally extended from said audio connector to form a one-piece integrated adapter.

4. The RF communicator, as recited in claim 3, wherein said retaining means further comprises two securing rings securely attaching to said enclosing shelter at two slit ends of said splitting slit respectively so as to securely hold said RF cable and said audio cable in position along said splitting slit.

5. The RF communicator, as recited in claim 4, wherein a portion of said enclosing shelter is cut along a circumferential thereof to form said splitting slit to allow said end portion of said RF cable extending out of said interior cavity through said splitting slit.

6. The RF communicator, as recited in claim 5, wherein said retaining means further comprises a sealing shelter which extends from said enclosing shelter to said FR connector and receives said end portion of said RF cable in a concealed manner.

7. The RF communicator, as recited in claim 6, wherein said retaining means further comprises a T-shaped tubular retainer securely mounted at said enclosing shelter at said splitting slit, wherein said tubular retainer has first, second and third openings that said audio cable is extended from said first opening to said second opening within said interior cavity while said end portion of said RF cable is extended from said first opening to said third opening to extend out of said interior cavity of said enclosing shelter.

8. The RF communicator, as recited in claim 5, wherein said retaining means further comprises a T-shaped tubular retainer securely mounted at said enclosing shelter at said splitting slit, wherein said tubular retainer has first, second and third openings that said audio cable is extended from said first opening to said second opening within said interior cavity while said end portion of said RF cable is extended from said first opening to said third opening to extend out of said interior cavity of said enclosing shelter.

9. The RF communicator, as recited in claim 4, wherein said retaining means further comprises a sealing shelter which extends from said enclosing shelter to said FR connector and receives said end portion of said RF cable in a concealed manner.

10. The RF communicator, as recited in claim 3, wherein a portion of said enclosing shelter is cut along a circumferential thereof to form said splitting slit to allow said end portion of said RF cable extending out of said interior cavity through said splitting slit.

11. The RF communicator, as recited in claim 2, wherein said retaining means further comprises two securing rings securely attaching to said enclosing shelter at two slit ends of said splitting slit respectively so as to securely hold said RF cable and said audio cable in position along said splitting slit.

12. The RF communicator, as recited in claim 2, wherein a portion of said enclosing shelter is cut along a circumferential thereof to form said splitting slit to allow said end portion of said RF cable extending out of said interior cavity through said splitting slit.

13. The RF communicator, as recited in claim 2, wherein said retaining means further comprises a T-shaped tubular retainer securely mounted at said enclosing shelter at said splitting slit, wherein said tubular retainer has first, second and third openings that said audio cable is extended from said first opening to said second opening within said interior cavity while said end portion of said RF cable is extended from said first opening to said third opening to extend out of said interior cavity of said enclosing shelter.

14. The RF communicator, as recited in claim 1, wherein said retaining means further comprises a sealing shelter which extends from said enclosing shelter to said RF connector and receives said end portion of said RF cable in a concealed manner.

15. A process of manufacturing a speaker microphone connector to communicatively connect a communication unit to a communication station, wherein the process comprises the steps of:
(a) receiving an audio cable and a RF cable along a tubular enclosing shelter, wherein said audio cable is electrically extended from an audio transmitter of said communication unit while said RF cable is operatively extended from a RF transmitter of said communication unit;
(b) forming a splitting slit at said enclosing shelter between first and second ends thereof, wherein said first end of said enclosing shelter is extended from said communication unit;
(c) pulling out an end portion of said RF cable out of an interior cavity of said enclosing shelter through said splitting slit such that said RF cable is split with said audio cable at said splitting slit;
(d) electrically coupling an audio connector with said audio cable at said second end of said enclosing shelter to connect with an audio outlet of said communication station for transmitting an audio signal between said communication station and said communication unit through said audio cable;
(e) operatively coupling a RF connector with said end portion of said RF cable to connect with a RF outlet of said communication station for transmitting a RF signal between said communication station and said communication unit through said audio cable.

16. The process, as recited in claim 15, further comprising a step of sealedly attaching a sealing element to said enclosing shelter to sealedly enclose said splitting slit so as to retain said RF cable in a splitting manner.

17. The process, as recited in claim 16, wherein said sealing element is integrally extended from said audio connector to form a one-piece integrated adapter.

18. The process, as recited in claim 17, further comprising a step of securely attaching two securing rings to said enclosing shelter at two slit ends of said splitting slit respectively so as to securely hold said RF cable and said audio cable in position along said splitting slit.

19. The process as recited in claim 18 wherein, in the step (b), further comprises a step of cutting off a portion of said enclosing shelter along a circumferential thereof to form said splitting slit to allow said end portion of said RF cable extending out of said interior cavity through said splitting slit.

20. The process as recited in claim 19 wherein, after the step (c), further comprises a step of receiving said end portion of said RF cable in a sealing shelter in a concealed manner.

21. The process, as recited in claim 20, further comprising a step of securely mounting a T-shaped tubular retainer at said enclosing shelter at said splitting slit, wherein said tubular retainer has first, second and third openings that said audio cable is extended from said first opening to said second opening within said interior cavity while said end portion of said RF cable is extended from said first opening to said third opening to extend out of said interior cavity of said enclosing shelter.

22. The process, as recited in claim 15, further comprising a step of securely attaching two securing rings to said enclosing shelter at two slit ends of said splitting slit respectively so as to securely hold said RF cable and said audio cable in position along said splitting slit.

23. The process as recited in claim 15 wherein, in the step (b), further comprises a step of cutting off a portion of said enclosing shelter along a circumferential thereof to form said splitting slit to allow said end portion of said RF cable extending out of said interior cavity through said splitting slit.

24. The process as recited in claim 15 wherein, after the step (c), further comprises a step of receiving said end portion of said RF cable in a sealing shelter in a concealed manner.

25. The process, as recited in claim 15, further comprising a step of securely mounting a T-shaped tubular retainer at said enclosing shelter at said splitting slit, wherein said tubular retainer has first, second and third openings that said audio cable is extended from said first opening to said second opening within said interior cavity while said end portion of said RF cable is extended from said first opening to said third opening to extend out of said interior cavity of said enclosing shelter.

26. A communicator for connecting with a communication station having a first unit, a first outlet, a second unit, and a second outlet, wherein said communicator comprises:
a communication unit which comprises a first transmitter and a second transmitter; and
a speaker microphone connector, which comprises:
a first transmission unit comprising a first cable electrically extended from said first transmitter and a first connector which is electrically coupled said first cable for connecting with said first outlet of said communication station so as to transmit a first signal between said communication station and said communication unit through said first cable;
a second transmission unit comprises a second cable operatively extended from said second transmitter and a second connector which is operatively coupled with said second cable for connecting with said second outlet to transmit a second signal between communication station and said communication unit through said second cable; and
a tubular enclosing shelter having a first end extended from said communication unit, a second end coupling with said first connector, an interior cavity receiving said first cable and said second cable therein that an end portion of said second cable is extending out of said enclosing shelter position between said first and second ends thereof to couple with said second connector, and a retaining device for retaining said second cable in a splitting manner, wherein said retaining device contains a splitting slit formed at said enclosing shelter between said first and second ends thereof for said end portion of said second cable extending out of said interior cavity of said enclosing shelter, and comprises a sealing element sealedly attached to said enclosing shelter to sealedly enclose said splitting slit so as to retain said second cable in a splitting manner.

* * * * *